United States Patent [19]
Lapp et al.

[11] 3,737,961
[45] June 12, 1973

[54] METHOD OF MAKING AN IMPREGNATED PLASTIC DIELECTRIC CAPACITOR

[75] Inventors: John Lapp, Franklin; Norbert R. Weiler, Greendale, both of Wis.

[73] Assignee: McGraw-Edison Company, Milwaukee, Wis.

[22] Filed: Dec. 8, 1971

[21] Appl. No.: 206,044

[52] U.S. Cl............ 29/25.42, 117/66, 117/138.8 E, 317/258
[51] Int. Cl............................................. H01g 13/04
[58] Field of Search ................... 117/66, 68, 105.3, 117/105.4, 138.8 E; 29/25.42; 317/242, 260, 258, 243; 174/25 R

[56] References Cited
UNITED STATES PATENTS

| | | | |
|---|---|---|---|
| 362,547 | 5/1887 | Sherk | 117/105.3 |
| 2,293,453 | 8/1942 | Clark | 317/242 X |
| 3,450,968 | 6/1969 | Cox | 317/258 |
| 3,454,842 | 7/1969 | Wurster | 317/243 |

FOREIGN PATENTS OR APPLICATIONS

| | | | |
|---|---|---|---|
| 106,535 | 1/1939 | Australia | 317/260 |
| 1,045,527 | 10/1966 | Great Britain | 174/25 R |
| 1,131,774 | 10/1968 | Great Britain | 317/258 |

*Primary Examiner*—E. A. Goldberg
*Attorney*—John W. Michael, Geruit D. Foster and Joseph A. Gemignani et al.

[57] ABSTRACT

An all film capacitor includes a sheet of plastic material in film form wound with the capacitor electrode foil, the film being capable of impregnation by a dielectric liquid medium and having been wetted by the dielectric liquid prior to impregnation. The plastic film and dielectric liquid form the dielectric system of the capacitor. In processing, a dielectric liquid medium is applied to the film to provide a wet film and the wet film is wound with the foil into a capacitor pack. The pack, or packs, are subjected to an elevated temperature and vacuum to draw off volatile material such as water vapor, i.e., the pack is dried. Subsequent to drying, the pack, or packs, are positioned in a capacitor tank for soaking in the dielectric liquid, again at an elevated temperature and under a vacuum. Complete impregnation of the film by the liquid dielectric occurs during soaking. If desired, the same film material can be wound on the outside of the capacitor packs to insulate the packs from the capacitor tank.

10 Claims, 8 Drawing Figures

PATENTED JUN 12 1973
3,737,961
SHEET 1 OF 2
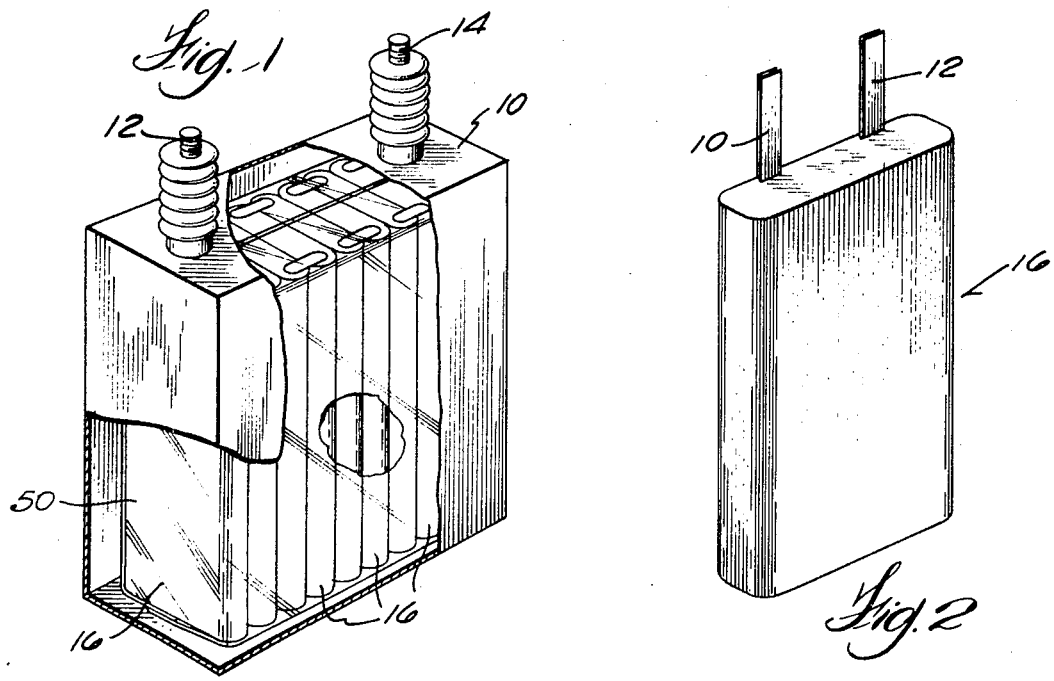
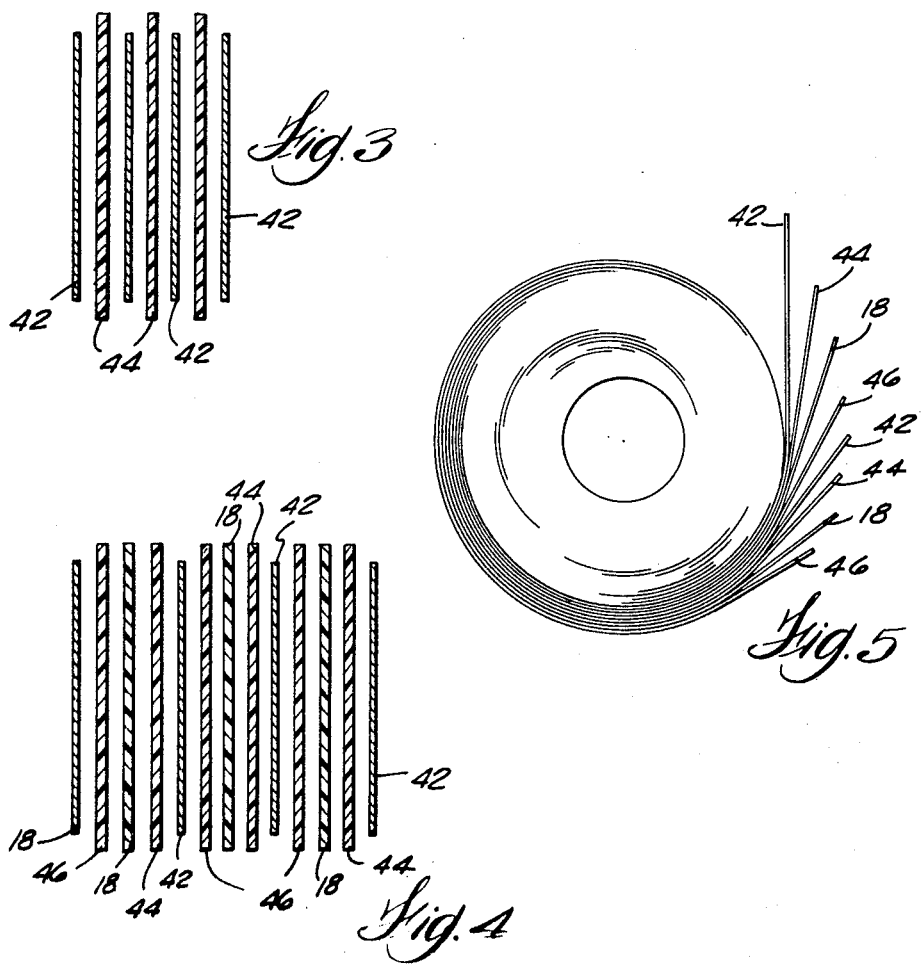

METHOD OF MAKING AN IMPREGNATED PLASTIC DIELECTRIC CAPACITOR

BACKGROUND OF THE INVENTION

This invention relates to capacitors and, more particularly, to the dielectric system for a capacitor.

In the past, capacitors, e.g., power factor correction capacitors, have utilized paper in their dielectric systems, the paper being impregnated by a suitable dielectric liquid. Recently, it has been proposed to utilize materials such as polypropylene in the dielectric system, the polypropylene being in the form of a sheet of film and being used in conjunction with paper, this arrangement will be referred to as a paper-film dielectric system.

It has been recognized that the use of the polypropylene film in the dielectric system reduces losses, increases energy density (KVAR/unit volume) and provides greater capacitor reliability. However, paper-film systems still incorporate paper and this is detrimental from an electrical standpoint and it has been recognized that complete elimination of the paper from the dielectric system would produce even lower losses, greater energy densities, greater reliability, and also provide for easier production techniques. However, heretofore the presence of the paper in the dielectric system has been considered essential for the achievement of dielectric impregnation, and thus has been used in spite of its adverse effect on the electrical characteristics of the capacitor. More particularly, it is necessary that the material in the capacitor which separates the capacitor electrodes, i.e., the paper or the film sheet, be completely impregnated with a suitable dielectric liquid. Heretofore, and consistent with accepted manufacturing techniques, the presence of the paper in the dielectric system was deemed to be necessary to achieve complete impregnation of the film-paper of the dielectric system of the film-paper capacitors. The presence of the paper is detrimental electrically because the film, e.g., polypropylene, has a lower dielectric constant than that of the paper and therefore, a higher electrical stress occurs on the film than on the paper, this produces an uneven distribution of the electrical stress in the capacitor and detracts from efficient operation of the dielectric system.

SUMMARY OF THE INVENTION

Among the objects of this invention is to provide an all film capacitor and thereby eliminate entirely the use of paper from the capacitor dielectric system.

For the achievement of this and other objects, this invention proposes to apply a dielectric fluid, preferably a liquid impregnant, to a sheet of plastic material, the plastic material being capable of functioning in the dielectric system and of being impregnated by the dielectric liquid. This produces a wet film carrying a part of the dielectric liquid. For example, a plastic material selected from the group consisting of polypropylene, polyethylene, polyethylene terephthalate, and polycarbonate and being in sheet form can be used as the film material and a conventional medium such as chlorinated diphenyl used as the dielectric liquid. The wet film, i.e., the plastic carrying the impregnant and having a portion of the impregnant absorbed therein resulting from the initial application of the dielectric liquid, is wound with a conductive foil, which forms the capacitor electrodes, to form a capacitor pack. The initially applied liquid dielectric results in spacing the film and foil, or adjacent layers of film where more than one sheet of film is wound with the foil, to allow the liquid impregnant to penetrate and flow between the interfaces of the film, or films, and the foil during the later carried on impregnation.

In the finish process of the capacitor pack, the pack is dried by subjecting it to an elevated temperature under a vacuum. The drying step removes the volatile materials, e.g., water vapor for more complete dielectric penetration in to the pack and complete impregnation. The dielectric liquid impregnant has a sufficiently high surface tension that it is not removed during this drying step.

Subsequent to the drying step, the pack, or a plurality of electrically and mechanically connected packs, are placed in a capacitor tank and soaked in the dielectric liquid impregnant. The soaking is again carried out at an elevated temperature and under a vacuum to insure complete impregnation.

If desired, insulation of the capacitor pack, or packs, from the capacitor tank can be achieved by winding the sheet film material around the outside of the pack before the final soaking step.

Other objects and advantages will be pointed out in, or be apparent from, the specification and claims, as will obvious modifications of the embodiments shown in the drawings in which:

FIG. 1 is a perspective view partially broken away of a capacitor constructed in accordance with this invention;

FIG. 2 is a perspective view of a capacitor pack prior to assembly into the capacitor of FIG. 1;

FIG. 3 is a section view, somewhat exploded, of a portion of the pack of FIG. 2;

FIG. 4 is a section view, somewhat exploded, of a portion of an alternative pack film-foil arrangement;

FIG. 5 illustrates the pack during the winding operation but prior to forming and with the arrangement of FIG. 3;

DESCRIPTION OF THE PREFERRED EMBODIMENT

Figure 6:
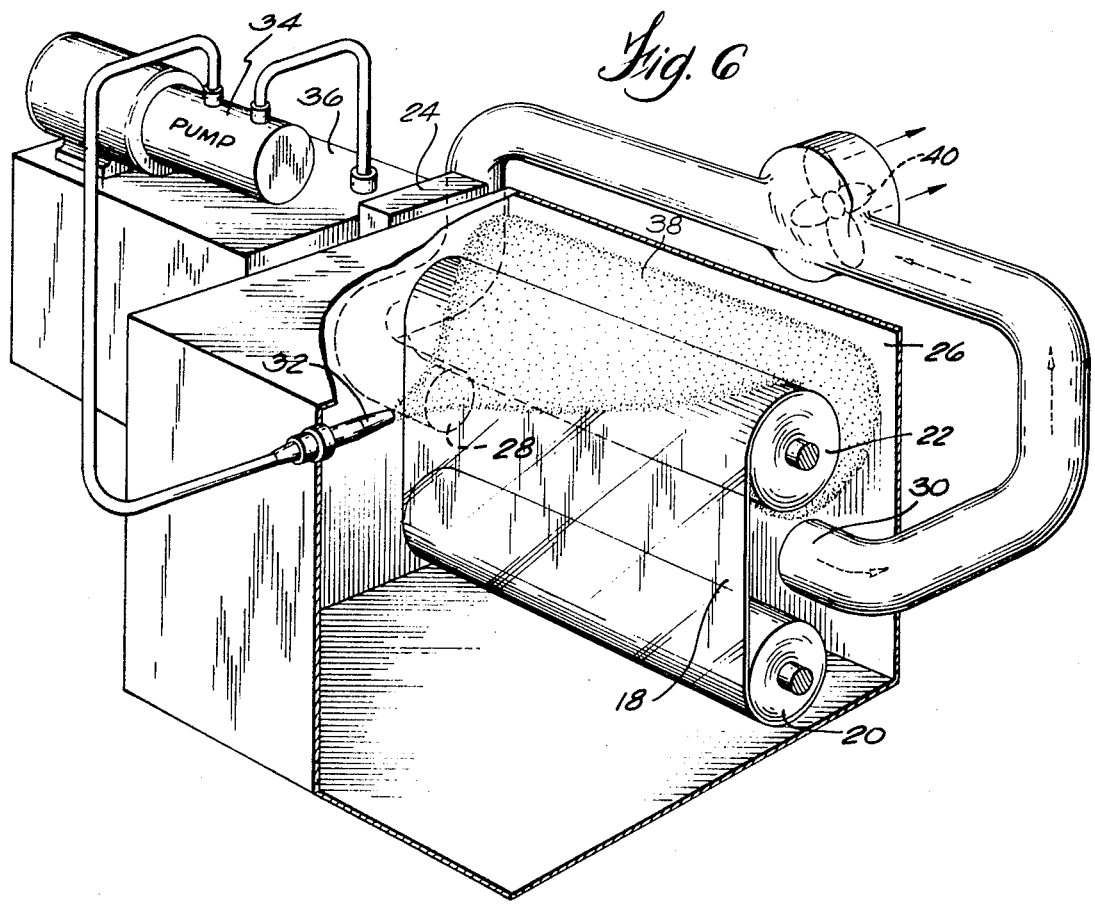
FIG. 6 illustrates schematically the manner of applying the liquid impregnate to the film sheets.
Figure 8:
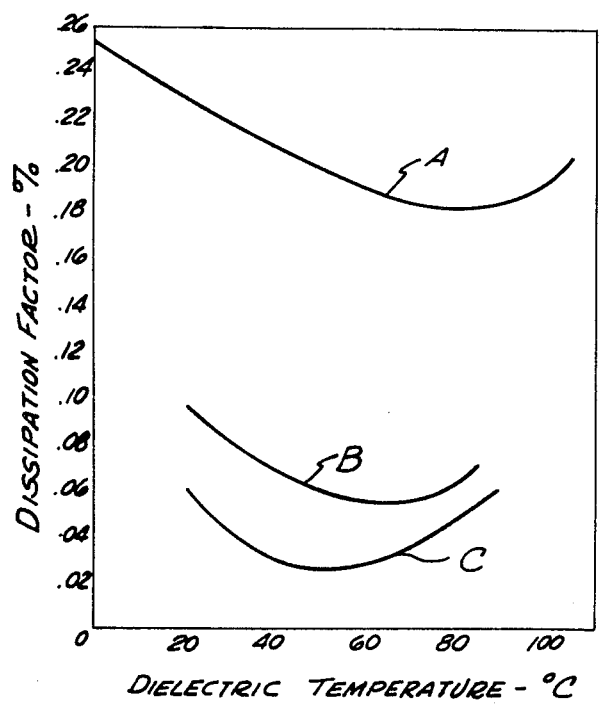
FIG. 8 illustrates the improved electrical characteristics of the all film capacitor as compared to the recognized prior art dielectric capacitor systems.

With particular reference to the drawings, a conventional capacitor construction includes metal outer housing or tank 10, terminals 12 and 14, and a plurality of capacitor packs 16 which are electrically connected either in series or parallel depending on the desired voltage and KVAR combination. As will be described more completely hereinafter packs 16 take up the major portion of the interior area of the tank and the remainder of the tank interior is filled with a suitable dielectric fluid.

As is conventional practice, a pack 16 usually comprises a series of continuously wound convolutions wherein an electrically conductive foil, such as aluminum, is wound with alternate layers of a dielectric medium. In accordance with prior art arrangements, the dielectric medium was either paper or paper and sheet plastic film such as polypropylene. It has been discovered that paper is not essential to the impregnation of the sheet if the sheet impregnation is carried on in the proper manner and, in accordance with this invention, the dielectric medium which is wound with the conductive foil consists only of sheet plastic film and paper is entirely eliminated. For proper operation of the capacitor, the dielectric medium wound with the aluminum foil must be capable of impregnation by a dielectric liquid. In accordance with this invention complete impregnation of the sheet plastic film is insured by applying the dielectric liquid to the plastic film prior to winding with the electrode foil, i.e., the plastic film is wetted prior to final winding.

Turning to the wetting and initial film impregnation, dielectric plastic material in sheet film form, preferably from about 0.0004 to 0.001 inches thick, is fed from a supply or idler roll 20 to a driven roll 22, the latter being driven by a suitable electric motor arrangement 24. The idler and driven rolls are located in a generally closed cage 26, the cage being closed with the exception of two exhaust openings 28 and 30, one in each of the opposed sides of the cage. The function of the exhaust vents 28 and 30 will become apparent from the following description. A spray nozzle 32 is mounted in cage 26 and is connected to pump 34 which delivers liquid from reservoir 36 to the nozzle.

Nozzle 32 is located adjacent to and directed at driven roll 22 so that spray 38 from the nozzle is directed at the driven roll.

In operation, a suitable dielectric liquid is stored in reservoir 36 and drawn from the reservoir 36 by pump 34 for delivery to spray nozzle 32 from which it is discharged at driven roll 22. The spray applies a layer of dielectric liquid directly to the outer surface of film 18 as it is rolled onto driven roll 22. As the film is rolled on itself, the opposite side of the film has the dielectric liquid applied as a result of direct contact with the side which had been sprayed. This provides a wetted film having a layer of dielectric liquid on both sides. It has been observed that it is advantageous to spray at or near the driven roll since the turbulance set up by the rotation of the driven roll serves to draw the spray around the roll onto the film, this and the blotting engagement of the spray wetted side of the sheet film with the other side of the sheet film is perhaps best illustrated in FIG. 6.

The exhaust vents are attached to a suitable exhaust fan 40 which draws from the cage to thereby provide a continuous stream of liquid spray over the driven roll. That is, the exhaust fan removes excess spray from the area of the driven roll allowing spray nozzle 32 to continually introduce fresh spray into the area. By positioning exhaust vents 28 and 30 on opposite sides of the cage, complete distribution of spray from nozzle 32 across the length of driven roll 22 and correspondingly the width of sheet 18 is insured. The drawn off liquid can be re-cycled for further use.

The initially sprayed liquid dielectric will impregnate the film. Initially, the liquid dielectric will have rather a random distribution of the film, i.e., there will be areas of high concentration of liquid dielectric in the film, areas of lighter concentration, and areas with light or heavy droplets of liquid dielectric clinging to the surface. The liquid dielectric will migrate into and through the film and will ultimately reach an equilibrium point.

The wet film is then wound with the electrode foil material. As illustrated in FIG. 3, foil 42 can be wound with a single sheet of wet film 18 to thereby produce a pack having alternate layers of foil and wet film. An alternative would be that illustrated in FIG. 4 wherein adjacent convolutions of foil 42 are separated by a combination of wet film 18 and two dry sheets of film 44 and 46. It has been observed that various arrangements of dry and and wet film can be used and complete impregnation can be achieved so long as a wet sheet of film engages a dry sheet of film and/or the foil and so long as two dry sheets of film are not in engagement. Carrying through the embodiment of FIG. 4, it can be seen in FIG. 5 that this results in convolutions of foil, dry film, sprayed film, dry film, and foil. Film is always the outside layer of the convolutions. Instead of spraying, the liquid dielectric can be applied to brushing, or dunking.

After the arrangement of wound foil and film has been completed, the final impregnation process can be completed, as can be the further processing of the capacitor.

With the above description in mind, the complete steps and an example process will now be described.

Polypropylene material is used as the film and preferably is a high density biaxially oriented polypropylene. However, other plastic materials capable of being impregnated by the dielectric liquid impregnant can be used. Plastic is used in its broad sense, i.e., any one of many high-polymeric substances, including both natural and synthetic products. Examples of other specific materials are polyethylene, polyethylene prephthalate, and polycarbonate. The liquid dielectric used both in the initial spray of the film and in the final impregnation can be a conventionally used dielectric liquid such as chlorinated diphenyl with or without a suitable additive. Where used the additive can be a small percentage of Bis (3, 4, -epoxy-6, methylcyclohexylmethyl) Adipate, which is known commercially as ERL-4289. The chlorinated diphenyl can also be used with a mixture of ERL-4289 plus 1, 2, epoxy-3-phenoxypropane. Other liquid impregnants can also be used, for example, vegetable oils such as cotton seed oil and caster oil, polybutene, or the additives discussed above in connection with chlorinated diphenyl can be used alone. Castor oil can be used with an additive such as Octadecyl 3(3, 5 Di-Tert-But-4-Hydroxyphenyl) Propionate which is known commercially as Irganox 1076.

The liquid dielectric, chlorinated diphenyl with or without an additive, is sprayed onto the polypropylene sheet 18 as described above. The wound sheet of wet dielectric film is then wound with aluminum foil, for example in the arrangement illustrated in FIGS. 4 and 5. Other alternative arrangements of foil and wet and/or dry film can be used subject to the limitation discussed above that two sheets of dry film do not come into face-to-face engagement which would retard complete impregnation of the dielectric system. The layer of liquid impregnant on the film maintains spacing between the film and its adjacent dry film or electrode thereby permitting impregnant to flow between the sheets during the impregnation cycle.

The capacitor pack formed by the wound foil and film is put through a drying cycle. Generally, the capacitor is assembled and then the packs, assembled in the capacitor, are put through further processing, i.e., drying and impregnation. In the drying cycle, the pack is subjected to an elevated temperature, approximately 180° F, under a vacuum of approximately 20–50 microns. In practice, it is desirable to heat the packs at the above prescribed temperature for approximately 24 hours and then, maintaining such heat, subject the packs to the above mentioned vacuum for an additional 24 hours. This drying step is for the purpose of driving off volatile matters such as water vapor and to eliminate any voids which may otherwise have occurred in the pack during the winding process. The liquid impregnant which was applied to the sheet film is not affected by the vacuum or the elevated temperature during the drying step.

The "dried" packs are then assembled into the capacitor tanks and submerged in dielectric liquid. The arrangement, dielectric liquid and packs and the tank are then elevated to a temperature of 120°–170° F and soaking is allowed to continue for a period of up to 24 to 48 hours during which time complete impregnation of the film occurs. After this step, the tank can be topped off with dielectric to insure that the entire interior of tank 10 is filled with liquid. During the impregnation step, the sheet film expands such that virtually the entire interior of the tank is filled by the packs.

It is possible to fully impregnate the sheet film before being wound with the conductive foil electrodes but the prior described arrangement where impregnation is completed after winding with the foil is the preferred procedure.

As to the material from which the film can be made, several examples were given above, for power factor capacitors polypropylene is desirable whereas for energy storage capacitors polyethylene terephtalate, or a combination of other films might be desirable.

The foil usually used in capacitors generally has the inherent quality of having a shiny side and a dull side. Experience has shown that the impregnant will penetrate the interface between the film and the dull side of the foil faster than between film and the shiny side of the film. Therefore, where dry sheets are used in the pack, it is preferred that the dull side of the foil be in contact with the dry film.

Also, it has been observed that it is advantageous to have the liquid dielectric in a clean evacuated condition and to spray using an inert gas such as argon. This, plus the fact that the cage in which spraying occurs is closed, except for the exhaust system, means that the film will be sprayed in a virtually inert atmosphere.

In the final capacitor construction the capacitor packs 16 are electrically insulated from the walls of tank 10. This can effectively be done by winding extra turns of film 18 over the outside of the assembled packs. This is illustrated in FIG. 1 by windings 46 at the top and bottom of the packs. These windings are placed on the packs just prior to assembly of the mechanically and electrically interconnected packs into the tank and prior to the final impregnation process.

It will be appreciated that after the foil and film are wound, and prior to final impregnation, they can be pressed to take the shape illustrated in FIG. 2 and electrodes 50 and 52 attached to the foil which are then used in the series or parallel connection of the packs within the tank.

Figure 7:
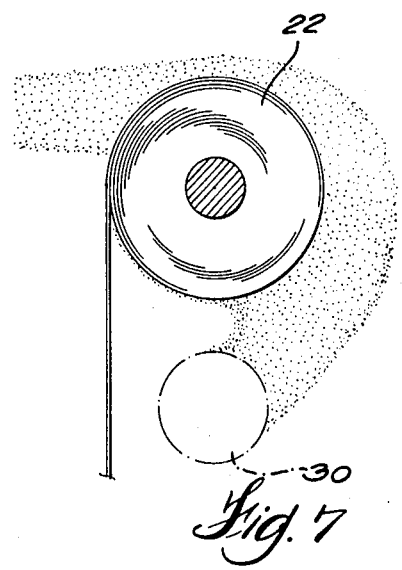
FIG. 7 is a side view of the driven roll of FIG. 6.

The above described arrangement results in an overall shortening of the impregnation cycle. This is due because a portion of the liquid necessary for impregnation is already present in the pack and in the film itself, and the soaking time can thus be utilized more effectively. Furthermore, preparation for impregnation is cut substantially and the wet film providing spacing between adjacent layers permits better dielectric penetration. From an electrical standpoint, the absence of paper in the dielectric system results in more KVAR per cubic inch of power factor correction capacitor. The absence of the paper also results in lower losses in the dielectric system. In this respect, reference is made to FIG. 7 which shows the losses (dissipation factor in percentage) for all paper capacitors curve A, film paper capacitors curve B, and curve C the all film capacitor of this invention. It will be readily observed that the losses of the all film capacitor are substantially lower than any one of the other two. A final advantage is that the capacitor can have a smaller size and weight per KVAR and thereby facilitate handling of the capacitor.

Although but several embodiments of the present invention have been illustrated and described, it will be apparent to those skilled in the art that various changes and modifications may be made therein without departing from the spirit of the invention or from the scope of the appended claims.

We claim:

1. The method of processing capacitor packs comprising the steps of
   wetting the opposite sides a sheet of plastic film by applying a dielectric medium in fluid form to said opposite sides and thereby partially impregnating said film with said dielectric medium and so that said thus applied dielectric medium will maintain a spacing between said film sides and a confronting surface for subsequent flow of a dielectric fluid between said film sides and confronting surfaces without requiring mechanical alteration of said film sides,
   subsequent to wetting said film sides immersing said film in a further supply of dielectric fluid for complete impregnation of said film,
   and subsequent to wetting said film sides winding said film with electrically conductive foil so that plastic film provides the only solid dielectric spacing medium between adjacent layers of conductive foil.

2. The method of claim 1 wherein said film is wound with said foil subsequent to wetting said film sides and prior to said immersion in said dielectric fluid.

3. The method of claim 1 wherein said film is polypropylene.

4. The method of claim 1 wherein said film is selected from the group consisting of polypropylene, polyethylene, polyethylene terephtalate, and polycarbonate.

5. The method of claim 1 wherein in applying said dielectric fluid to said film
   said dielectric fluid is sprayed on said film,
   after spraying said film is wound on itself so that both sides of said film receive said dielectric liquid, and
   said spraying being achieved from a spray nozzle located in the area wherein said film is wound on itself and is directed at the roll formed as said film is wound on itself.

6. The method of claim 5 wherein said film is wound in a direction away from said spray nozzle.

7. The method of claim 5
   wherein said film as it is being sprayed and wound is supported in a generally closed cage and said cage includes exhaust ports adjacent the axial ends of said wound film,
   and including the step of drawing the atmosphere from said cage through said ports during spraying so that spray impinges areas along the entire axial length of the film.

8. The method of claim 7 wherein said film is wound with said foil subsequent to wetting said film sides and prior to said immersion in said dielectric fluid.

9. The method of claim 5 wherein said film is wound with said foil subsequent to wetting said film sides and prior to said immersion in said dielectric fluid.

10. The method of claim 1 including the steps of winding said film with the sides thereof wetted with layers of dry film without the sides thereof wetted and said foil but with said wetted film separating adjacent layers of dry film.

* * * * *